United States Patent
Felts et al.

(10) Patent No.: US 6,907,075 B2
(45) Date of Patent: Jun. 14, 2005

(54) ENCODING METHOD FOR THE COMPRESSION OF A VIDEO SEQUENCE

(75) Inventors: Boris Felts, Marseille (FR); Beatrice Pesquet-Popescu, Fontenay-Sous-Bois (FR); Vincent Bottreau, Paris (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 657 days.

(21) Appl. No.: 10/069,736
(22) PCT Filed: Jun. 22, 2001
(86) PCT No.: PCT/EP01/07096
§ 371 (c)(1),
(2), (4) Date: Feb. 26, 2002
(87) PCT Pub. No.: WO02/01881
PCT Pub. Date: Jan. 3, 2002

(65) Prior Publication Data
US 2002/0150164 A1 Oct. 17, 2002

(30) Foreign Application Priority Data
Jun. 30, 2000 (EP) .............................. 00401892

(51) Int. Cl.$^7$ ................................ H04N 7/12
(52) U.S. Cl. ............ 375/240.19; 375/240; 375/240.01; 375/240.12; 375/240.16
(58) Field of Search ............... 375/240.19, 240, 375/240.01, 240.11, 240.12, 240.16, 240.18

(56) References Cited

U.S. PATENT DOCUMENTS 5,798,794 A * 8/1998 Takahashi ............... 375/240.11
6,370,197 B1 * 4/2002 Clark et al. ............. 375/240.19

FOREIGN PATENT DOCUMENTS

EP 004012167 5/2000

OTHER PUBLICATIONS

P. Campisi et al; "A Wavelet Transform Based Videoconferencing System With Spatio–Temporal Scalability" Wavelet Applications in Signal and Image Processing VII, Denver, CO, Jul. 19–23, 1999, vol. 3813, pp. 850–860, XP008001348.

"An embedded wavelet video coder using three–dimensional set partitioning in hierarchical trees (SPIHT)", by B. Kim and W.A. Pearlman, Proceedings DCC' 97, Data Compression Conference, Snowbird, UT, USA, Mar. 25–27, 1997, pp. 251–260.

* cited by examiner

Primary Examiner—Allen Wong

(57) ABSTRACT

The invention relates to an encoding method for the compression of a video sequence. Said method, using a three-dimensional wavelet transform, is based on a hierarchical subband coding process in which the subbands to be encoded are scanned in an order that preserves the initial subband structure of the 3D wavelet transform. According to the invention, a temporal (resp. spatial) scalability is obtained by performing a motion estimation at each temporal resolution level (resp. at the highest spatial resolution level), and only the part of the estimated motion vectors necessary to reconstruct any given temporal (resp. spatial) resolution level is then encoded and put in the bitstream together with the bits encoding the wavelet coefficients at this given temporal (resp. spatial) level, said insertion in the bitstream being done before encoding texture coefficients at the same temporal (resp. spatial) level. Such a solution avoids to encode and send all the motion vector fields in the bitstream, which would be a drawback when a low bitrate is targeted and the receiver only wants a reduced frame rate or spatial resolution.

2 Claims, 4 Drawing Sheets

US 6,907,075 B2

ENCODING METHOD FOR THE COMPRESSION OF A VIDEO SEQUENCE

The present invention relates to an encoding method for the compression of a video sequence divided into groups of frames and decomposed by means of a three-dimensional (3D) wavelet transform leading to a given number of successive resolution levels that correspond to the decomposition levels of said transform, said method being based on a hierarchical subband encoding process leading from the original set of picture elements (pixels) of each group of frames to transform coefficients constituting a hierarchical pyramid, a spatio-temporal orientation tree—in which the roots are formed with the pixels of the approximation subband resulting from the 3D wavelet transform and the offspring of each of these pixels is formed with the pixels of the higher subbands corresponding to the image volume defined by these root pixels—defining the spatio—temporal relationship inside said hierarchical pyramid, the subbands to be encoded being scanned one after the other in an order that respects the parent-offspring dependencies formed in said tree and preserves the initial subband structure of the 3D wavelet transform.

The video streaming over heterogeneous networks requires a high scalability capability. That means that parts of a bitstream can be decoded without a complete decoding of the sequence and can be combined to reconstruct the initial video information at lower spatial or temporal resolutions (spatial/temporal scalability) or with a lower quality (PSNR scalability). A convenient way to achieve all the three types of scalability is a three-dimensional (3D) wavelet decomposition of the motion compensated video sequence.

In a previous European patent application filed by the Applicant on May 3, 2000, with the number 00401216.7 (PHFR000044), a simple method of texture coding having this property has been described. In that method, as well as in other published documents (such as for instance, in "An embedded wavelet video coder using three-dimensional set partitioning in hierarchical trees (SPIHT)", by B. Kim and W. A. Pearlman, Proceedings DCC'97, Data Compression Conference, Snowbird, Utah, U.S.A., 25–27, Mar. 1997, pp.251–260), all the motion vector fields are encoded and sent in the bitstream, which may become a major drawback when a low bitrate is targeted and the receiver only wants a reduced frame rate or spatial resolution.

It is therefore an object of the invention to propose an encoding method more adapted to the situation where a high scalability must be obtained.

To this end, the invention relates to an encoding method such as defined in the introductory part of the description and which is moreover characterized in that, in view of a temporal scalability, a motion estimation is performed at each temporal resolution level, the beginning of which is indicated by flags inserted into the bitstream, and only the estimated motion vectors necessary to reconstruct any given temporal resolution level are encoded and put in the bitstream together with the bits encoding the wavelet coefficients at this given temporal level, said motion vectors being inserted into said bitstream before encoding texture coefficients at the same temporal level.

In another embodiment, the invention also relates to an encoding method such as defined in said introductory part and which is characterized in that, in view of a spatial scalability, a motion estimation is performed at the highest spatial resolution level, the vectors thus obtained being divided by two in order to obtain the motion vectors for the lower spatial resolutions, and only the estimated motion vectors necessary to reconstruct any spatial resolution level are encoded and put in the bitstream together with the bits encoding the wavelet coefficients at this given spatial level, said motion vectors being inserted into said bitstream before encoding texture coefficients at the same spatial level, and said encoding operation being carried out on the motion vectors at the lowest spatial resolution, only refinement bits at each spatial resolution being then put in the bitstream bitplane by bitplane, from one resolution level to the other.

The technical solution thus proposed allows to encode only the motion vectors corresponding to the desired frame rate or spatial resolution, instead of sending all the motion vectors corresponding to all possible frame rates and all spatial resolution levels.

BRIEF DESCRIPTION OF THE DRAWINGS

The present invention will now be described, by way of example, with reference to the accompanying drawings in which.

DETAILED DESCRIPTION OF THE INVENTION

Figure 1:
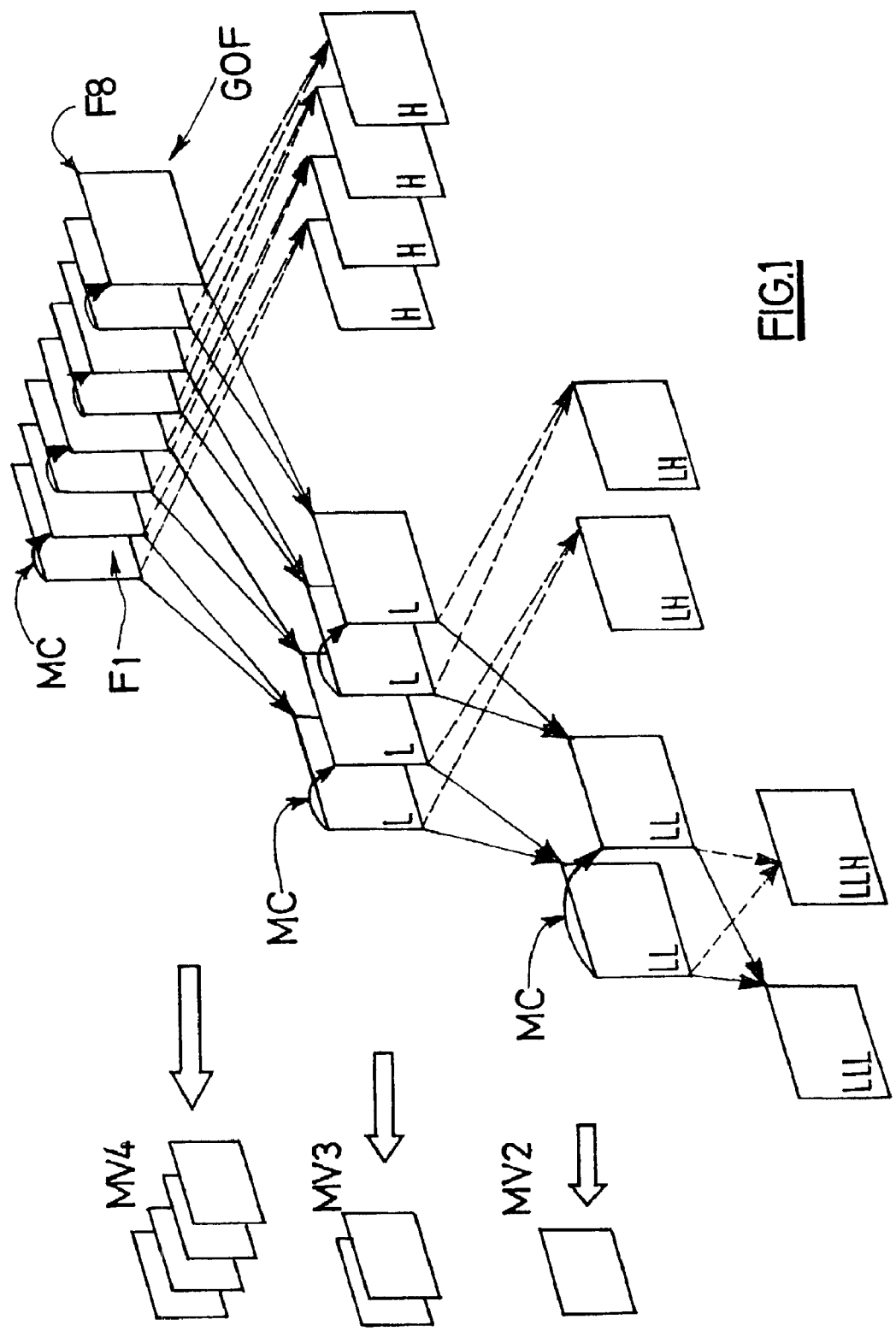
FIG. 1 illustrates a temporal subband decomposition of the video information with motion compensation using the Haar multiresolution analysis.
Figure 2:
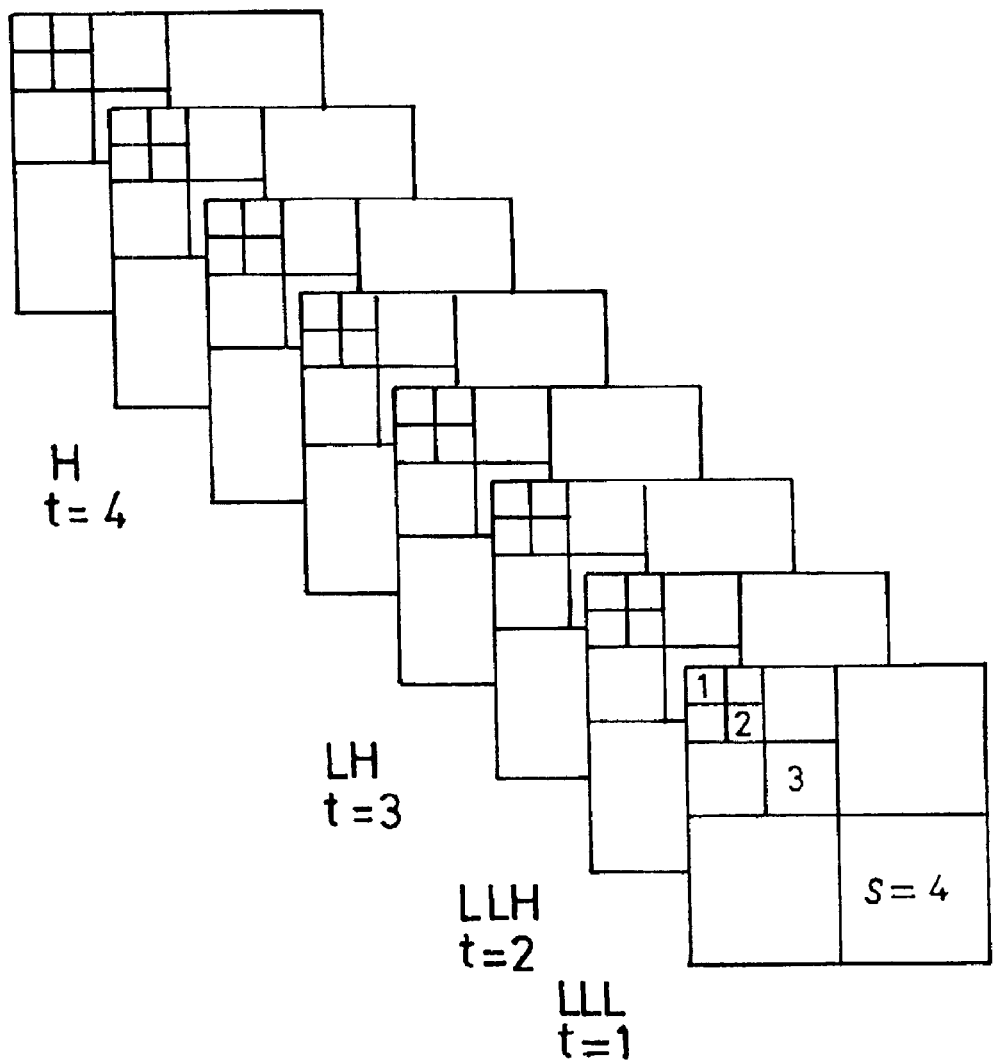
FIG. 2 shows the spatio-temporal subbands resulting from a three-dimensional wavelet decomposition.

A temporal subband decomposition of a video sequence is shown in FIG. 1. The illustrated 3D wavelet decomposition with motion compensation is applied to a group of frames (GOF), referenced F1 to F8. In this 3D subband decomposition scheme, each GOF of the input video is first motion-compensated (MC in FIG. 1) (this step allows to process sequences with large motion) and then temporally filtered using Haar wavelets (the dotted arrows correspond to a high-pass temporal filtering, while the other ones correspond to a low-pass temporal filtering) and after these two operations, each temporal subband is spatially decomposed into a spatio-temporal subband, which leads to a 3D wavelet representation of the original GOF, as illustrated in FIG. 2. In FIG. 1, three stages of decomposition are shown (L and H=first stage; LL and LH=second stage ; LLL and LLH= third stage). At each temporal decomposition level of the illustrated group of 8 frames, a group of motion vector fields is generated (MV4 at the first level, MV3 at the second one, MV2 at the third one). When a Haar multiresolution analysis is used for the temporal decomposition, since one motion vector field is generated between every two frames in the considered group of frames at each temporal decomposition level, the number of motion vector fields is equal to half the number of frames in the temporal subband, i.e. four at the first level of motion vector fields, two at the second one, and one at the third one. At the decoder side, in order to reconstruct a given temporal level, only the motion vector fields at that level and at the lower temporal resolutions (reduced frame rate) are needed.

(A) Temporal Scalability

Figure 3:
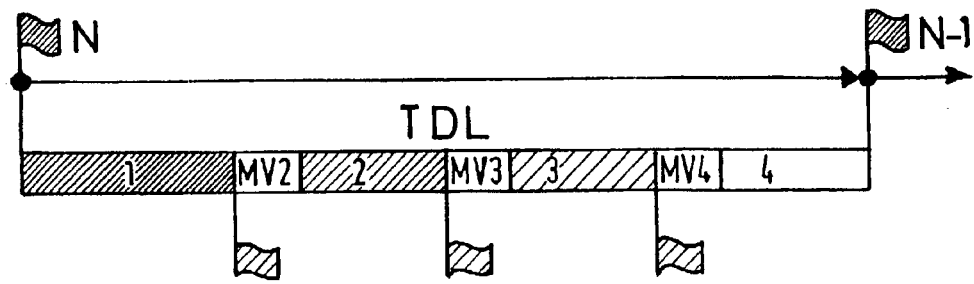
FIG. 3 illustrates the motion vector insertion in the bitstream for temporal scalability.
Figure 4:
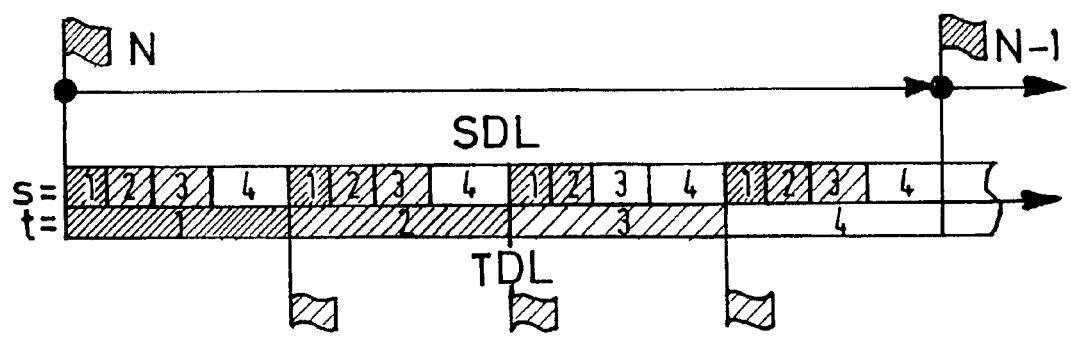
FIG. 4 shows the structure of the bitstream obtained with a temporally driven scanning of the spatio-temporal tree.

This observation leads, according to the invention, to organize the bitstream in a way that allows a progressive decoding, as described for example in FIG. 3: three temporal decomposition levels TDL (as shown in FIG. 1) yield four temporal resolution levels (1 to 4), which represent the possible frame rates that can be obtained from the initial frame rate. The coefficients corresponding to the lowest resolution temporal level are first encoded, without sending motion vectors at this level, and, for all the other reconstruction frame rates, the motion vector fields and the frames of the corresponding high frequency temporal subband are encoded. This description of the bitstream organization up to now only takes into account the temporal levels. However, for a complete scalability, one has to consider the spatial scalability inside each temporal level. The solution for wavelet coefficients was described in the European patent application already cited, and it is reminded in FIG. 4: inside each temporal scale, all the spatial resolutions are successively scanned (SDL=spatial decomposition levels), and therefore all the spatial frequencies are available (frame rates t=1 to 4; display sizes s=1 to 4). The upper flags separate two bitplanes, and the lower ones two temporal decomposition levels.

(B) Spatial Scalability

In order to be able to reconstruct a reduced spatial resolution video, it is not desirable to transmit at the beginning of the bitstream the motion vector fields of full resolution. Indeed, it is necessary to adapt the motion described by the motion vectors to the size of the current spatial level. Ideally, it would be desirable to have first a low resolution motion vector field corresponding to the lowest spatial resolution and then to be able to progressively increase the resolution of the motion vectors according to the increase in the spatial resolution. Only the difference from a motion vector field resolution to another one would be encoded and transmitted.

It will be assumed that the motion estimation is performed by means of a block-based method like full search block matching or any other derived solution, with an integer pixel precision on full resolution frames (this hypothesis does not reduce the generality of the problem: if one wants to work with half-pixel precision for motion vectors, by multiplying by 2 all the motion vectors at the beginning, one returns in the previous case of integer vectors, even though they will represent fractional displacements). Thus, motion vectors are represented by integers. Given the full resolution motion vector field, in order to satisfy the above requirements of spatial scalability, the motion vector resolution is reduced by a simple divide-by-2 operation. Indeed, as the spatial resolution of the approximation subband is reduced by a factor 2, while the motion is the same as in the full resolution subband, the displacements will be reduced by a factor 2. This division is implemented for integers by a simple shift.

The size of the blocks in the motion estimation must be chosen carefully: indeed, if the original size of the block is 8×8 in the full resolution, it will become 4×4 in the half resolution, then 2×2 in the quarter, and so on. A problem will therefore appear if the original size of the blocks is too small: the size can be null for small spatial resolutions. Thus it must be checked that the original size is compatible with the number of decomposition/reconstruction levels.

Figure 5:
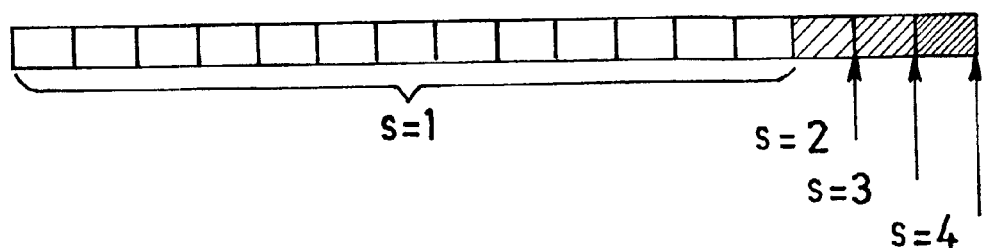
FIG. 5 is a binary representation of a motion vector and its progressive transmission from the lowest resolution to the highest.
Figure 6:
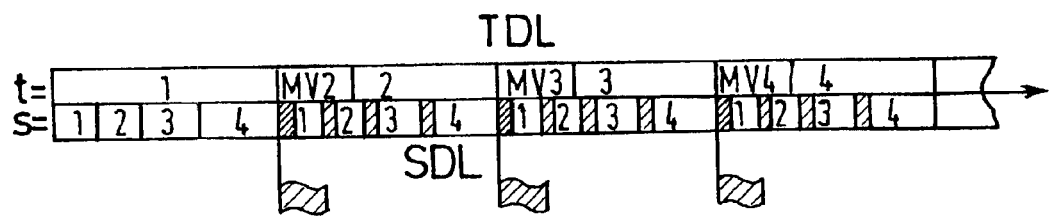
FIG. 6 shows the bitstream organization for motion vector coding in the proposed scalable approach.

It is now assumed that one has S spatial decomposition levels and that one wants the motion vectors corresponding to all possible resolutions, from the lowest to the highest. Then, either the initial motion vectors are divided by $2^S$ or a shift of S positions is performed. The result represents the motion vectors corresponding to the blocks from lowest resolution whom the size is divided by $2^S$. A division by $2^{S-1}$ of the original motion vector would provide the next spatial resolution. But this value is already available from the previous operation. Indeed, it corresponds to a shift of S−1 positions. The difference from the first operation is the bit in the binary representation of the motion vector with a weight of $2^{S-1}$. It is then sufficient to add this bit (the refinement bit) to the previously transmitted vector to reconstruct the motion vector at a higher resolution, which is illustrated in FIG. 5 for S=4. This progressive transmission of the motion vectors allows to include in the bitstream the refinement bits of the motion vector fields from one spatial resolution to another just before the bits corresponding to the texture at the same spatial level. The proposed method is resumed in FIG. 6.

The motion vectors at the lowest resolution are encoded with a DPCM technique followed by entropy coding using usual VLC tables (e.g., those used in MPEG-4). For the other resolution levels, a complete bitplane composed of the refinement bits of the motion vector field has to be encoded, for instance by means of a contextual arithmetic encoding, with the context depending on the horizontal or vertical component of the motion vector.

The part of the bitstream representing motion vectors precedes any information concerning the texture. The difference with respect to a "classical" non-scalable approach is that the hierarchy of temporal and spatial levels is transposed to the motion vector coding. The most significant improvement with respect to the previous technique is that the motion information can be decoded progressively. For a given spatial resolution, the decoder does not have to decode parts of the bitstream that are not useful at that level.

What is claimed is:

1. An encoding method for the compression of a video sequence divided into groups of frames and decomposed by means of a three-dimensional (3D) wavelet transform leading to a given number of successive resolution levels that correspond to the decomposition levels of said transform, said method being based on a hierarchical subband encoding process leading from the original set of picture elements (pixels) of each group of frames to transform coefficients constituting a hierarchical pyramid, a spatio-temporal orientation tree—in which the roots are formed with the pixels of the approximation subband resulting from the 3D wavelet transform and the offspring of each of these pixels is formed with the pixels of the higher subbands corresponding to the image volume defined by these root pixels—defining the spatio-temporal relationship inside said hierarchical pyramid, the subbands to be encoded being scanned one after the other in an order that respects the parent-offspring dependencies formed in said tree and preserves the initial subband structure of the 3D wavelet transform, said method being further characterized in that, in view of a temporal scalability, a motion estimation is performed at each temporal resolution level, the beginning of which is indicated by flags inserted into the bitstream, and only the estimated motion vectors necessary to reconstruct any given temporal resolution level are encoded and put in the bitstream together with the bits encoding the wavelet coefficients at this given temporal level, said motion vectors being inserted into said bitstream before encoding texture coefficients at the same temporal level.

2. An encoding method for the compression of a video sequence divided into groups of frames and decomposed by means of a three-dimensional (3D) wavelet transform leading to a given number of successive resolution levels that correspond to the decomposition levels of said transform, said method being based on a hierarchical subband encoding process leading from the original set of picture elements (pixels) of each group of frames to transform coefficients constituting a hierarchical pyramid, a spatio-temporal orientation tree—in which the roots are formed with the pixels of the approximation subband resulting from the 3D wavelet transform and the offspring of each of these pixels is formed with the pixels of the higher subbands corresponding to the image volume defined by these root pixels—defining the spatio-temporal relationship inside said hierarchical pyramid, the subbands to be encoded being scanned one after the other in an order that respects the parent-offspring dependencies formed in said tree and preserves the initial subband structure of the 3D wavelet transform, said method being further characterized in that, in view of a spatial scalability, a motion estimation is performed at the highest spatial resolution level, the vectors thus obtained being divided by two in order to obtain the motion vectors for the lower spatial resolutions, and only the estimated motion vectors necessary to reconstruct any spatial resolution level are encoded and put in the bitstream together with the bits encoding the wavelet coefficients at this given spatial level, said motion vectors being inserted into said bitstream before encoding texture coefficients at the same spatial level, and said encoding operation being carried out on the motion vectors at the lowest spatial resolution, only refinement bits at each spatial resolution being then put in the bitstream bitplane by bitplane, from one resolution level to the other.

* * * * *